United States Patent
Hein et al.

(10) Patent No.: US 12,441,055 B2
(45) Date of Patent: Oct. 14, 2025

(54) THERMALLY CROSSLINKABLE COMPOSITION FOR USE AS A BINDER IN A BINDER JETTING PROCESS

(71) Applicant: FRAUNHOFER-GESELLSCHAFT ZUR FÖRDERUNG DER ANGEWANDTEN FORSCHUNG E.V., Munich (DE)

(72) Inventors: Sebastian Boris Hein, Lilienthal (DE); Claus Aumund-Kopp, Bremen (DE)

(73) Assignee: FRAUNHOFER-GESELLSCHAFT ZUR FÖRDERUNG DER ANGEWANDTEN FORSCHUNG E.V., Munich (DE)

(*) Notice: Subject to any disclaimer, the term of this patent is extended or adjusted under 35 U.S.C. 154(b) by 879 days.

(21) Appl. No.: 17/295,178

(22) PCT Filed: Nov. 27, 2019

(86) PCT No.: PCT/EP2019/082675
§ 371 (c)(1),
(2) Date: May 19, 2021

(87) PCT Pub. No.: WO2020/109358
PCT Pub. Date: Jun. 4, 2020

(65) Prior Publication Data
US 2021/0387409 A1    Dec. 16, 2021

(30) Foreign Application Priority Data
Nov. 29, 2018 (DE) .................... 10 2018 220 611.2

(51) Int. Cl.
| | | |
|---|---|---|
| *B29C 64/165* | (2017.01) | |
| *B33Y 10/00* | (2015.01) | |
| *B33Y 70/00* | (2020.01) | |
| *C08G 63/12* | (2006.01) | |
| *C08G 69/26* | (2006.01) | |
| *C08G 69/28* | (2006.01) | |
| *C08G 69/36* | (2006.01) | |
| *C08G 69/44* | (2006.01) | |

(52) U.S. Cl.
CPC ............ *B29C 64/165* (2017.08); *C08G 63/12* (2013.01); *C08G 69/26* (2013.01); *C08G 69/28* (2013.01); *C08G 69/36* (2013.01); *C08G 69/44* (2013.01); *B33Y 10/00* (2014.12); *B33Y 70/00* (2014.12)

(58) Field of Classification Search
CPC ...... B29C 64/165; C08G 63/12; C08G 69/44; C08G 69/26; B33Y 10/00; B33Y 70/00
See application file for complete search history.

(56) References Cited

U.S. PATENT DOCUMENTS

| | | | | |
|---|---|---|---|---|
| 5,204,055 A | * | 4/1993 | Sachs ................. | B33Y 40/00 264/432 |
| 2009/0275680 A1 | * | 11/2009 | Bruchmann .......... | C09J 167/07 528/307 |
| 2016/0263828 A1 | | 9/2016 | Ederer et al. | |
| 2017/0137641 A1 | | 5/2017 | Saito et al. | |

FOREIGN PATENT DOCUMENTS

| | | | | |
|---|---|---|---|---|
| DE | 60312443 T3 | 12/2007 | | |
| DE | 102006038858 A1 | 2/2008 | | |
| DE | 102013018182 A1 | 4/2015 | | |
| DE | 102015006363 A1 | 12/2016 | | |
| DE | 102016121760 A1 | 5/2018 | | |
| EP | 3309224 A1 | 4/2018 | | |
| JP | 2018158564 A | 10/2018 | | |
| KR | 20160078355 A | 7/2016 | | |
| KR | 20170108305 A | 9/2017 | | |
| WO | WO-2018081053 A1 | * | 5/2018 | ............... A61P 1/00 |
| WO | 2018111885 A1 | 6/2018 | | |

OTHER PUBLICATIONS

Applicant: Fraunhofer-Gesellschaft Zur Forederung Der Angewandten Forschung E.V.; "Thermally Crosslinkable Composition for Use as a Binder in a Binder Jetting Process"; Korean Patent Application No. 10-2021-7015221 Filed: May 20, 2021; Korean Office Action—Notice of Grounds for Rejection dated Nov. 21, 2022; 8 pgs.
Japanese Patent Application No. 2021-528901; Japanese Office Action-Reasons for Refusal; May 27, 2022; 6 pgs.
International Union of Pure and Applied Chemistry; Compendium of Chemical Terminology, Gold Book, Version 2.3.3, Feb. 24, 2014; 3 pgs.
Germany Office Action, dated Jun. 12, 2019; 4 pgs.

* cited by examiner

*Primary Examiner* — Marc S Zimmer
*Assistant Examiner* — Surbhi M Du
(74) *Attorney, Agent, or Firm* — Tarolli, Sundheim, Covell &Tummino LLP

(57) ABSTRACT

The present invention relates to the use of a liquid composition comprising one or more monomers for the production of a polyester, of a polyamide or of a polyesteramide, where at least one monomer is at least trifunctional, as binder in the binder-jetting process. The invention further relates to a process for the production of a shaped body by binder jetting.

9 Claims, No Drawings

THERMALLY CROSSLINKABLE COMPOSITION FOR USE AS A BINDER IN A BINDER JETTING PROCESS

The present invention relates to a liquid composition which can be used as a thermally curable binder in the powder binder-jetting process.

The standard EN ISO/ASTM 52921:2017 defines additive manufacturing processes into the following categories:
- "Material Extrusion": Additive manufacturing process in which the construction material is selectively distributed through a nozzle or aperture
- "Vat Photopolymerization": Additive manufacturing process in which, in a container, liquid construction material is selectively cured by photopolymerization
- "Material Jetting": Additive manufacturing process in which droplets of the construction material are selectively applied
- "Binder Jetting": Additive manufacturing process in which a liquid binder is selectively applied in order to consolidate a powder
- "Sheet Lamination": Additive manufacturing process in which layers of a material are surface-bonded in order to form an object
- "Powder Bed Fusion": Additive manufacturing process in which a locally selective introduction of energy (e.g. by a laser beam) is used to melt defined regions in a powder bed
- "Directed Energy Deposition": Additive manufacturing process in which bundled thermal energy is used to bond materials at their application site by fusion The binder-jetting process is also termed "3D printing" (e.g. VDI guideline VDI 3405, December 2014).

In the case of additive manufacturing by binder jetting, a liquid binder is applied to a powder bed by way of a print head. The layer-by-layer build-up of the powder bed and locally printing the binder at predefined areas on each of the applied powder layers thus produces a component, which has been created before with the aid of a CAD file. Because this is a powder-bed-based process, other terms sometimes used are "3D powder printing" and "powder binder jetting". The powder is by way of example a metal powder, ceramic powder or plastics powder, or "sand" (e.g. pulverulent quartz sand). After the printing, the binder is cured, thus producing a workable green component in which the powder particles are held together in the desired geometry by the binder. In the case of sinter-based processed, the binder is removed thermally after the removal of excess powder and the component is subjected to a sintering step, thereby providing a dense shaped body.

Relevant properties of a binder for use in the binder-jetting process are the wetting of the powder bed by the binder that is to be printed, long residence times of the binder in the printing system without blockage of nozzles in the print head, ability of the binder to be precisely applied, fast drying of the binder and rapid curing at relatively low temperatur, controllable crosslinking reaction after printing, good adhesion of the binder on the powder particles, high strength of the component in the green state (i.e. of the powder with cured binder) and residue-free thermal removability of the cured binder before sintering of the powder-based body.

WO 2018/111885 A1 describes a binder for the binder-jetting process, which comprises a polyvinyl alcohol and a solvent.

DE 10 2006 038 858 A1 describes a binder-jetting process using a binder which is based on methacrylates and/or styrenes or which comprises a polyurethane resin or epoxy resin.

DE 10 2013 018 182 A1 and DE 10 2015 006 363 A1 describe a binder-jetting process in which the binder comprises a novolak system and/or resol system, i.e. a prepolymeric phenol-formaldehyde polycondensate.

DE 10 2016 121 760 A1 describes a binder-jetting process in which the binder comprises a saccharide, gum arabic, a resin, cellulose fibers, a wax, casein, an epoxy resin, a polyurethane, a polyvinyl acetate, rubber, cellulose, a polyacrylate, PVB, PVP, PVA or vinylpyrrolidone-vinyl acetate copolymer.

It is an object of the present invention to provide a curable composition which is suitable as binder for the binder-jetting process and in particular may enable long residence times in the printing system without blockage of nozzles in the print head, permits rapid drying and rapid curing at relatively low temperature and, after curing, gives a green body of high strength (i.e. gives high green strength), and has good thermal removability.

The object is solved by the use of a liquid composition, comprising
- one or more monomers for the production of a polyester, polyamide or polyesteramide, where at least one monomer is at least trifunctional,
- a solvent, as a binder in a binder-jetting process.

A monomer is a compound which can form a polymer via a polymerization reaction. The repeating units of the polymer therefore derive from the monomer(s) used for the polymerization. IUPAC (IUPAC Compendium of Chemical Terminology, Gold Book, Version 2.3.3, 2014, p. 606: "*Functionality of a Monomer*") defines the functionality of a monomer as the number of bonds which the monomer is able to form within the polymer. When monomers having a functionality F=2 (i.e. bifunctional monomers) are used exclusively, a linear polymer is obtained. When monomers having a functionality F≥3 (i.e. monomers that are at least trifunctional) are also used in the polymerization, branching points arise in the polymer chains and a branched or three-dimensionally crosslinked polymer is obtained.

In the present invention, the liquid composition that can be used for binder jetting comprises one or more monomers for the production of a polyester, polyamide or polyesteramide (i.e. monomers which can react to give a polyester, a polyamide or a polyesteramide). As is known to the person skilled in the art, a polyester is a polymer having repeating units linked by way of ester groups, and a polyamide is a polymer having repeating units linked by way of amide groups. When the polymer comprises not only repeating units linked by way of ester groups but also repeating units linked by way of amide groups, it is a polyesteramide. The monomers present in the liquid composition are therefore compounds which can react to form ester groups or amide groups. Such monomers are known to the person skilled in the art. The monomers react in known manner by way of a polycondensation to give a polyester, a polyamide or a polyesteramide.

As is known to the person skilled in the art, a bifunctional monomer for the polyester synthesis or polyamide synthesis can react with itself or with other monomers to form at most two ester groups or amide groups, whereas by way of example a trifunctional monomer is capable of forming three ester groups or amide groups in the polymer chain.

Because the liquid composition comprises at least one monomer having a functionality F≥3, i.e. a monomer that is at least trifunctional, the curing of the composition gives a branched or three-dimensionally crosslinked polyester, polyamide or polyesteramide. As will also be described hereinafter, the liquid composition can optionally also comprise one or more bifunctional monomers.

The at least trifunctional monomers and, if present, the bifunctional monomers react in known manner by way of a polycondensation to give a polyester, a polyamide or a polyesteramide. The person skilled in the art is aware of suitable reaction conditions for such a polycondensation. It is preferable that the monomers are not acrylates or methacrylates.

As also described hereinafter in more detail, it has surprisingly been found in the present invention that
the liquid composition of the invention can enable long residence times in the printing system without blockage of nozzles in the print head,
and permits rapid drying and rapid curing at relatively low temperature, and
the cured polyester or polyamide or polyesteramide holds the powder particles together in a very stable manner and thus gives a green body of high strength, and also has good thermal removability.

By virtue of this property profile, the liquid composition defined above has excellent suitability for the use as binder in a binder-jetting process.

As already described above, the binder-jetting process is an additive manufacturing process in which a liquid binder is applied by printing to a powder layer by way of a print head at defined regions. The layer-by-layer construction of the powder bed and the local application of the binder in the prescribed areas in each of the applied powder layers finally produces a defined shaped body (i.e. a shaped body created with the aid of a CAD file). The binder-jetting process is also termed "3D printing" (e.g. VDI guideline VDI 3405, December 2014). Because this is a powder-bed-based process, other terms sometimes used are "3D powder printing" and "powder binder jetting".

As a result of a thermal treatment (curing), the at least trifunctional monomers and, if present, the bifunctional monomers react to give a branched or three-dimensionally crosslinked polyester, polyamide or polyesteramide. As described in more detail hereinafter, this thermal treatment can by way of example be carried out each time the liquid binder has been printed on a previously applied powder layer, or might be carried out at the end after the application and printing of all of the powder layers required for the production of the shaped body. In order to conduct the process in the most efficient manner possible, it is preferable that the entire quantity of binder which has been applied by printing to the powder layers is cured by a thermal treatment only after all of the powder layers required for the production of the shaped body have been applied within the construction chamber.

The polymerization of the monomers to give the polyester, polyamide or polyesteramide takes place in known manner via a polycondensation.

After the curing and the removal of the unbound powder, a shaped body is obtained in which the powder particles have been bonded to one another by the polyester, the polyamide or the polyesteramide. The powder is here usually in an unsintered state. A shaped body of this type with the as-yet unsintered powder held together by the polyester, the polyamide or the polyesteramide is hereinafter also termed a green body.

As stated above, the liquid binder composition comprises at least one monomer that is at least trifunctional, i.e. is able to be linked to at least three neighboring repeat units by way of an ester group or an amide group in the polymer chain of the polyester, polyamide or polyesteramide. Another term used hereinafter for the at least one trifunctional monomer is "crosslinker monomer".

Suitable monomers having a functionality F≥3 for the production of branched polyesters, polyamides or polyesteramides are known to the person skilled in the art.

The at least trifunctional monomer is by way of example a compound having at least three functional groups $A^1$, $A^2$ and $A^3$, where the functional groups $A^1$, $A^2$ and $A^3$ are, independently from each other, a hydroxy group, an amino group (in particular —$NH_2$), a carboxylic acid group (i.e. —C(O)OH) or salt (e.g. an ammonium salt $NH_4^+$) of said carboxylic acid group, a carboxylic ester group (i.e. —C(O)OR) or an acyl halide group (i.e. —C(O)X, where X=halide) and the functional groups $A^1$, $A^2$ and $A^3$ can be identical or different, or where two of the functional groups $A^1$-$A^3$ together form a carboxylic anhydride group or a cyclic ether group (for example an epoxy group) and the third functional group is one of the abovementioned functional groups (i.e. a hydroxy group, an amino group, a carboxylic acid group or salt of said carboxylic acid group, a carboxylic ester group or an acyl halide group).

When one of the functional groups $A^1$-$A^3$ is a carboxylic ester group, it can by way of example have the following formula:
—C(O)OR, where R is $C_{1-8}$-alkyl (preferably $C_{1-4}$-alkyl, more preferably $C_{1-2}$-alkyl) or aryl (e.g. a substituted or unsubstituted phenyl group).

When the crosslinker monomer is tetrafunctional, the compound can by way of example also have a further functional group $A^4$, where $A^4$ is as defined for the abovementioned functional groups $A^1$-$A^3$.

When the crosslinker monomer has a functionality F=n, the compound by way of example contains n functional groups $A^1$-$A^n$, where each of these functional groups is as defined for the abovementioned functional groups $A^1$-$A^3$. The crosslinker monomer has by way of example a functionality F of 3-6, more preferably 3-4.

The at least trifunctional crosslinker monomer is by way of example a polyol having at least 3 hydroxy groups (e.g. 3-6 hydroxy groups); an aromatic trihydroxy compound; a polyamine having at least 3 amino groups (e.g. 3-6 amino groups); a hydroxycarboxylic acid in which the sum total of the hydroxy groups and the carboxylic acid groups is at least 3 (e.g. 3-6, more preferably 3-4); an amino acid in which the sum total of the amino groups and the carboxylic acid groups is at least 3 (e.g. 3-6, more preferably 3-4); a hydroxy amino acid; a polycarboxylic acid containing at least 3 (e.g. 3-6, preferably 3-4) carboxylic acid groups or an anhydride of said polycarboxylic acid; or a mixture of at least two of the abovementioned compounds. Carboxylic acid groups can also be present in the form of a salt (e.g. as a $NH_4^+$ salt). An amino group is in particular —$NH_2$.

The polyol is by way of example glycerol; pentaerythritol; di(pentaerythritol); trimethylolpropane; di(trimethylolpropane), which is also termed bis(2,2-dimethylolbutyl) ether; a sugar alcohol (in particular a $C_{4-6}$ sugar alcohol such as xylitol, threitol, erythritol, mannitol or sorbitol); a cyclic polyol such as inositol; a sugar (in particular a $C_{5-6}$ sugar, i.e. a pentose or hexose); a branched polyether polyol; or a mixture of at least two of these compounds. It is preferable that the polyol is glycerol or pentaerythritol or a mixture of these two polyols.

The aromatic trihydroxy compound is by way of example a trihydroxybenzene.

The polyamine is by way of example a dialkylenetriamine, a trialkylenetetramine, a linear or branched polyetheramine, an aromatic triamine, or a mixture of at least two of the abovementioned compounds.

The dialkylenetriamine and the trialkylenetetramine have by way of example the following formula:

$$R^2R^1N-(CH_2)_u-(N(R^3)-CH_2)_v)_x-N(R^4)-(CH_2)_w-NR^5R^6$$

where $R^1$, $R^2$, $R^3$, $R^4$, $R^5$ and $R^6$ are mutually independently hydrogen or $C_{1-4}$-alkyl, preferably hydrogen, x is 0 or 1, and u, v and w are, independently from each other, 2-6.

In the case of a dialkylenetriamine, x=0, whereas in the case of a trialkylenetetramine, x=1.

The aromatic triamine is by way of example unsubstituted or substituted melamine.

The sum total of the hydroxy groups and carboxylic acid groups in the hydroxycarboxylic acid is by way of example 3-4. Examples that may be mentioned in this connection are citric acid, isocitric acid, malic acid, tartronic acid, tartaric acid, mevalonic acid, or a mixture of at least two of these hydroxycarboxylic acids. In a preferred embodiment, the hydroxycarboxylic acid is citric acid or malic acid or a mixture of these two hydroxycarboxylic acids.

The sum total of the amino groups and carboxylic acid groups in the aminocarboxylic acid (amino acid) is by way of example 3-4; however, no hydroxy group is present. The following may be mentioned by way of example in this connection: aspartic acid, glutamic acid or lysine.

The hydroxyamino acid contains, in addition to the amino group and the carboxylic acid group, at least one hydroxy group. Serine may be mentioned in this connection by way of example.

The polycarboxylic acid having at least 3 carboxylic acid groups is by way of example propane-1,2,3-tricarboxylic acid; oxalosuccinic acid; aconitic acid; butane-1,2,3,4-tetracarboxylic acid; an aromatic tricarboxylic acid such as trimellitic acid, hemimellitic acid or trimesic acid; or a mixture of at least two of these polycarboxylic acids. The polycarboxylic acid can optionally also be present in the form of an anhydride in which two of the carboxylic acid groups have reacted to form a carboxylic anhydride group. The polycarboxylic acid contains no hydroxy and/or amino group and is therefore not a hydroxy- or aminocarboxylic acid.

In a preferred embodiment, the liquid binder composition comprises, as crosslinker monomers, (a) a polyol having at least 3, more preferably 3-6, hydroxy groups, and/or a polyamine having at least 3, more preferably 3-6, amine groups; and (b) at least one of the following compounds:

(b1) a hydroxycarboxylic acid in which the sum total of the hydroxy groups and the carboxylic acid groups is at least 3, more preferably 3-4, (b2) an amino acid in which the sum total of the amino groups and the carboxylic acid groups is at least 3, more preferably 3-4, (b3) a hydroxyamino acid, (b4) a polycarboxylic acid containing at least 3 (e.g. 3-6, more preferably 3-4) carboxylic acid groups or an anhydride of said polycarboxylic acid.

With regard to the preferred polyols, polyamines, hydroxycarboxylic acids, amino acids, hydroxyamino acids and polycarboxylic acids, reference can be made to what has been stated above.

The liquid binder composition preferably comprises, as crosslinker monomers, (a) a polyol having at least 3, more preferably 3-6, hydroxy groups, for example glycerol or erythritol or a mixture thereof;

(b) a hydroxycarboxylic acid in which the sum total of the hydroxy groups and the carboxylic acid groups is at least 3, more preferably 3-4, an example being citric acid or malic acid or a mixture of these two hydroxycarboxylic acids.

In another preferred embodiment, the liquid binder composition comprises, as crosslinker monomers, (a) a polyol having at least 3, more preferably 3-6, hydroxy groups, for example glycerol or erythritol or a mixture thereof;

(b) a polycarboxylic acid containing at least 3 (e.g. 3-6, more preferably 3-4) carboxylic acid groups or an anhydride of said polycarboxylic acid, e.g. propane-1,2,3-tricarboxylic acid; oxalosuccinic acid; aconitic acid; butane-1,2,3,4-tetracarboxylic acid; an aromatic tricarboxylic acid such as trimellitic acid, hemimellitic acid or trimesic acid; or a mixture of at least two of these polycarboxylic acids.

The liquid composition can also optionally comprise one or more bifunctional monomers. Suitable bifunctional monomers for the production of a polyester, polyamide or polyesteramide are known in principle to the person skilled in the art.

By way of example, the bifunctional monomer is a compound having a functional group A and a functional group B (hereinafter also termed bifunctional AB-type monomer), where the functional group A is an amine group (in particular —NH$_2$) or a hydroxy group (i.e. —OH) and the functional group B is a carboxylic acid group (i.e. —C(O)OH) or salt of said carboxylic acid group (e.g. an ammonium salt NH$_4^+$), a carboxylic ester group or an acyl halide group (i.e. —C(O)X, where X=halide such as Cl).

When the functional group B is a carboxylic ester group, is can by way of example have the following formula:

—C(O)OR, where R is $C_{1-8}$-alkyl (preferably $C_{1-4}$-alkyl, more preferably $C_{1-2}$-alkyl) or aryl (e.g. a substituted or unsubstituted phenyl group).

When A is a hydroxy group, the bifunctional monomer is by way of example a hydroxycarboxylic acid or salt of said carboxylic acid (e.g. an ammonium salt NH$_4^+$), a hydroxycarboxylic ester or a hydroxyacyl chloride.

The hydroxycarboxylic acid has by way of example the following formula:

$$HO-C(H)R-(CH_2)_x-C(O)OH$$

where

R is H, $C_{1-4}$-alkyl (preferably methyl or ethyl) or phenyl;

x is 0, 1 or 2.

The following compounds may be mentioned by way of example in this connection: glycolic acid, lactic acid, mandelic acid, β-hydroxybutyric acid, 4-hydroxybutyric acid.

The hydroxycarboxylic ester has by way of example the following formula:

$$HO-C(H)R^1-(CH_2)_x-C(O)OR^2$$

where
R¹ is H, $C_{1-4}$-alkyl (preferably methyl or ethyl) or phenyl;
R² is $C_{1-4}$-alkyl, preferably methyl or ethyl;
x is 0, 1 or 2.

The following may be mentioned by way of example in this connection: methyl lactate and ethyl lactate.

The hydroxyacyl halide has by way of example the following formula:

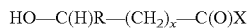
HO—C(H)R—(CH$_2$)$_x$—C(O)X where
R is H, $C_{1-4}$-alkyl (preferably methyl or ethyl) or phenyl;
X is a halide atom, for example Cl;
x is 0, 1 or 2.

When A is an amino group (in particular —NH$_2$), the bifunctional monomer is by way of example an amino acid, an aminocarboxylic ester or an aminoacyl chloride. The following may be mentioned by way of example in this connection: glycine, alanine or a $C_{1-4}$-alkyl ester of glycine (e.g. glycine ethyl ester).

In another exemplary embodiment, the bifunctional monomer is a compound having a functional group A and a functional group A' (hereinafter also termed bifunctional AA'-type monomer), where the functional groups A and A' are, independently from each other, a carboxylic acid group (i.e. —C(O)OH) or salt of said carboxylic acid group (e.g. an ammonium salt $NH_4^+$), a carboxylic ester group or an acyl halide group (i.e. —C(O)X, where X=halide such as Cl) and the functional groups A and A' can be identical or different, or where the functional groups A and A' together form a carboxylic anhydride group.

When the functional group A or A' is a carboxylic ester group, it can by way of example have the following formula:
—C(O)OR, where R is $C_{1-8}$-alkyl (preferably $C_{1-4}$-alkyl, more preferably $C_{1-2}$-alkyl) or aryl (e.g. a substituted or unsubstituted phenyl group).

For A=A', the bifunctional AA'-type monomer is by way of example a dicarboxylic acid or salt of said dicarboxylic acid, a dicarboxylic ester or a diacyl halide. For A≠A', the bifunctional AA'-type monomer is by way of example a monocarboxylic acid which also has, as a further functional group, a carboxylic ester group or acyl halide group.

The dicarboxylic acid can be a saturated or unsaturated dicarboxylic acid.

The saturated dicarboxylic acid has by way of example the following formula:

HOOC—(CH$_2$)$_x$—COOH where x is 0-4, more preferably 0-2.

Oxalic acid and succinic acid may be mentioned as examples of saturated dicarboxylic acids.

Examples of unsaturated dicarboxylic acids are maleic acid, fumaric acid, itaconic acid, citraconic acid and mesaconic acid. The unsaturated dicarboxylic acid is preferably maleic acid.

When the two dicarboxylic acid groups have reacted to form an anhydride group, the bifunctional monomer of the AA' type can also be present in the form of an anhydride, e.g. maleic anhydride.

In another exemplary embodiment, the bifunctional monomer is a compound having a functional group B and a functional group B' (hereinafter also termed bifunctional BB'-type monomer), where the functional groups B and B' are, independently from each other, a hydroxy group or an amino group and the functional groups B and B' can be identical or different, or where the functional groups B and B' together form a cyclic ether group (for example an epoxy group).

In the bifunctional BB'-type monomer it is preferable that B=B'. In this case, the bifunctional BB'-type monomer is a diol or a diamine. For the purposes of the present invention, B and B' can however also be different, the bifunctional monomer II thus being by way of example an amino alcohol (i.e. a compound having an amino group and a hydroxy group).

The diol is by way of example an alkanediol (e.g. a $C_{2-6}$-alkanediol), a polyethylene glycol, a polypropylene glycol, or a mixture of at least two of these compounds.

The alkanediol is by way of example a 1,2-alkanediol (e.g. ethylene glycol or propylene glycol), a 1,3-alkanediol or a 1,4-alkanediol.

The polyethylene glycol is by way of example a diethylene glycol, a triethylene glycol or a tetraethylene glycol. For the purposes of the present invention, it is however also possible to use higher polyethylene glycols, e.g. those of the following formula:

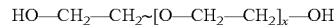
HO—CH$_2$—CH$_2$—[O—CH$_2$—CH$_2$]$_x$—OH where x=4-800.

The diamine is by way of example an alkanediamine (e.g. a $C_{2-8}$-alkanediamine, more preferably a $C_{2-6}$-alkanediamine), which can be linear or branched. The linear alkanediamine can by way of example have the following formula:

H$_2$N—CH$_2$—CH$_2$—(CH$_2$)$_x$—NH$_2$ where x is 0-6, more preferably 0-4.

Examples that may be mentioned in this connection are ethylenediamine and hexamethylenediamine.

The bifunctional monomers of the AB, AA' and BB' type described above can, if present, be present individually or else in combination with one another, for example one or more monomers of the AB type or at least one AA' monomer in combination with at least one BB' monomer.

In an exemplary embodiment of the present invention, the liquid binder composition comprises
(a) a polyol having at least 3, more preferably 3-6, hydroxy groups, for example glycerol or erythritol or a mixture thereof;
(b) a hydroxycarboxylic acid in which the sum total of the hydroxy groups and the carboxylic acid groups is at least 3, more preferably 3-4, an example being citric acid or malic acid or a mixture of these two hydroxycarboxylic acids;
(c) a dicarboxylic acid serving as a bifunctional monomer (e.g. a saturated dicarboxylic acid such as oxalic acid or succinic acid, or an unsaturated dicarboxylic acid such as maleic acid) or an anhydride of the dicarboxylic acid or an amino acid (for example glycine or alanine).

In another exemplary embodiment, the liquid binder composition comprises
(a) a polyol having at least 3, more preferably 3-6, hydroxy groups, for example glycerol or erythritol or a mixture thereof;
(b) a polycarboxylic acid containing at least 3 (e.g. 3-6, more preferably 3-4) carboxylic acid groups or an anhydride of said polycarboxylic acid, e.g. propane-1,2,3-tricarboxylic acid; oxalosuccinic acid; aconitic acid; butane-1,2,3,4-tetracarboxylic acid; an aromatic tricarboxylic acid such as trimellitic acid, hemimellitic acid or trimesic acid; or a mixture of at least two of these polycarboxylic acids;

(c) a dicarboxylic acid serving as a bifunctional monomer (e.g. a saturated dicarboxylic acid such as oxalic acid or succinic acid, or an unsaturated dicarboxylic acid such as maleic acid) or an anhydride of the dicarboxylic acid or an amino acid (for example glycine or alanine).

The at least trifunctional monomers described above and, if present, the bifunctional monomers react in known manner by way of a polycondensation to give a polyester, a polyamide or a polyesteramide. Suitable reaction conditions for such a polycondensation are known to the person skilled in the art. By way of example, the polycondensation takes place via a thermal treatment, at a temperature of at least 130° C., more preferably at least 150° C., for example in the range of 130° C. to 230° C., more preferably 160° C. to 210° C., particularly preferably 170° C. to 200° C., of the liquid composition applied to the powder.

The pH of the liquid composition can be varied over a wide range. The pH can be acidic, neutral or basic.

When the liquid composition also comprises one or more bifunctional monomers, the molar ratio of the bifunctional monomers to the at least trifunctional monomers can be varied over a wide range. By way of example, the molar ratio of the total quantity of monomers that are at least trifunctional monomers to the total quantity of bifunctional monomers is 1/20 to 100/1, more preferably 1/10 to 10/1.

As stated above, the liquid composition comprises one or more solvents. The solvent is by way of example water or an organic solvent, in particular a polar organic solvent such as a $C_{1-4}$ alcohol (e.g. ethanol or isopropanol) or acetone, or a mixture of at least two of these solvents. When water is present, the proportion thereof, based on the total volume of solvent, is 4-50% by volume.

The total concentration of the at least trifunctional monomers and of the optional bifunctional monomers in the liquid composition can be varied over a relatively wide range. By way of example, the total concentration of the monomers in the liquid composition is in the range of 10% by weight to 50% by weight, more preferably 15% by weight to 35% by weight.

The liquid composition can optionally comprise further additives. Examples that may be mentioned in this connection are wetting aids, microbiocides, flow aids, antifoams, plasticizers, corrosion-protection agents and chemical or rheological stabilizers.

The invention also relates to a process for the production of a shaped body by binder jetting, where
(i) a powder layer is applied on a construction platform or on a previously applied powder layer,
(ii) the liquid composition as described above is printed on defined areas of the powder layer which has been applied in step (i),
(iii) a further powder layer is applied on the powder layer which has been subjected to the printing step (ii) and the liquid composition as described above is printed on defined areas of the further powder layer,
(iv) optionally further powder layers required for the production of the shaped body are applied and the liquid composition as described above is printed on defined areas of each of the further powder layers,
(v) the liquid composition applied by printing is thermally treated, thereby forming a polyester, a polyamide or a polyesteramide and obtaining a shaped body, wherein the powder within the shaped body is bonded by the polyester, the polyamide or the polyesteramide.

With regard to the components and the properties of the liquid composition serving as a binder for the powder, reference may be made to what has been said above.

As already described above, the binder-jetting process is an additive manufacturing process. The layer-by-layer application of powder layers and the local application of the binder in the predefined areas in each of the applied powder layers finally produces a defined shaped body (i.e. a shaped body created with the aid of a CAD file). Another term used for the binder-jetting process is "3D printing" (e.g. VDI guideline VDI 3405, December 2014). Because it is a powder-bed-based process, the terms "3D powder printing" and "powder binder jetting" are sometimes also used.

Suitable devices and printers for a binder-jetting process are known to the person skilled in the art. The liquid binder composition is by way of example applied onto the powder layer by printing via a print head (e.g. a piezo print head). After the printing of a powder layer and before the application of a fresh powder layer, the construction platform is usually lowered by the thickness of the fresh powder layer.

Because the liquid composition comprises at least one monomer having a functionality F≥3, i.e. a monomer that is at least trifunctional, the thermal treatment ("curing") of the composition gives a branched or three-dimensionally cross-linked polyester, polyamide or polyesteramide.

The polyester or polyamide or polyesteramide formed by the thermal treatment bonds the powder particles to one another and thus results in a dimensionally stable shaped body.

A suitable temperature at which the monomers can be reacted to give a polyester, polyamide or polyesteramide (e.g. by way of a polycondensation) is known to the person skilled in the art or can optionally be determined by routine experimentation.

By way of example, the thermal treatment of the composition applied by printing takes place at a temperature of at least 130° C., more preferably at least 150° C., for example in the range of 130° C. to 230° C., more preferably 160° C. to 210° C., particularly preferably 170° C. to 200° C.

By way of example, step (v) takes place after all of the powder layers required for the production of the shaped body have been applied and respectively printed with the binder composition. It is therefore preferable that step (v) takes place after step (iii) or, when the production of the shaped body requires the application of further powder layers in step (iv), after step (iv).

With the binder-jetting process of the invention, it is possible to process a wide variety of different powders into a shaped body. By way of example, the powder is a powder of a metal (metal powder), of a plastic or of an inorganic material, e.g. of a ceramic material (ceramic powder) or sand (e.g. quartz powder). Suitable particle sizes of a powder for a powder-bed-based process such as binder jetting are known to the person skilled in the art. By way of example, a metal powder can have a volume-based d50 value in the range of 1-200 µm, and a ceramic powder can have a volume-based d50 value in the range of 10 nm to 200 µm; however, it is also possible to use for the purposes of the present invention powders having higher or lower d50 values. The pulverulent material used in the process of the invention can also be a granulate.

The powder in the shaped body obtained in step (v) is usually not yet sintered. The term green body or green compact is also used hereinafter for this shaped body formed by the as-yet unsintered powder and the polyester or the polyamide or polyesteramide. The green body obtained by the binder-jetting process of the invention is characterized by high mechanical strength.

The green body can by way of example be used as a casting core.

After curing, the green body can be freed of loose powder.

After step (v) it is optionally also possible to carry out one or more thermal treatment steps in order to remove the polyester, polyamide or polyesteramide from the shaped body by thermal decomposition and to bring about sintering of the powder (particularly when the powder is a metal powder or a ceramic powder). Suitable temperatures for the thermal decomposition of the polyester, polyamide or polyesteramide and for the sintering of the powder are known or can be determined by the person skilled in the art on the basis of that person's general technical knowledge. The thermal decomposition of the polyester, polyamide or polyesteramide and/or the sintering of the powder in the green body can take place by way of example in an inert, reductive or oxidative atmosphere tailored to the requirements of the powder (in the case of a metal powder preferably an inert or reductive atmosphere).

The invention further relates to a shaped body, comprising
a powder and
a polyester, a polyamide or a polyesteramide which bonds the powder, the polyester, polyamide or polyesteramide being obtained by a polymerization of one or more of the at least trifunctional monomers described above and optionally of one or more of the bifunctional monomers described above.

With regard to the preferred properties of the powder and of the polyester, polyamide or polyesteramide, and also of the monomers used for production thereof, reference may be made to what has been said above.

Because the polymerization uses at least one monomer having a functionality F≥3, i.e. one monomer that is at least trifunctional, the polyester, polyamide or polyesteramide that is present in the shaped body and that bonds the powder has been three-dimensionally crosslinked.

The powder in the shaped body is preferably still in unsintered form. In this case, the term green body or green compact can also be used for the shaped body.

The present invention further relates to a printer comprising the liquid composition described above.

The invention is described in more detail by the following examples.

EXAMPLES

A liquid binder of the following composition was used: 6.9% by weight of glycerol, 16.1% by weight of citric acid, 2.0% by weight of glycine, 75% by weight of isopropanol. In the polyester synthesis that takes place during curing, glycerol and citric acid served as monomers having a functionality of at least 3 (glycerol: trifunctional monomer; citric acid: tetrafunctional monomer).

The powder used was a stainless steel powder.

The stainless steel powder was applied layer-by-layer to a construction platform in a construction chamber for binder jetting, and each of the powder layers applied was printed with the liquid binder in the predefined areas. After application of all of the powder layers required for the production of the shaped body, curing was carried out at a temperature of 180° C. for 3 hours.

The curing gave a green body of high mechanical strength.

The liquid binder composition enables long residence times in the printing system without blockage of nozzles in the print head and—after the printing of the powder layer—rapid drying and also rapid curing at relatively low temperature, resulting in a green body of high strength (i.e. high green strength). The binder moreover has good thermal removability after curing, which means that after sintering it is possible to obtain a shaped body which contains no problematic residues of the cured binder.

The invention claimed is:

1. A process for the production of a shaped body by binder jetting, comprising:
   (i) applying a powder layer on a construction platform or on a previously applied powder layer,
   (ii) printing a liquid composition on defined areas of the powder layer which has been applied in step (i), the liquid composition comprising
   one or more monomers for the preparation of a polyester, polyamide or polyesteramide, where at least one monomer is at least trifunctional, and
   a solvent,
   (iii) applying a further powder layer on the powder layer which has been subjected to the printing step (ii) and printing liquid composition on defined areas of the further powder layer, the liquid composition comprising:
   one or more monomers for the preparation of a polyester, polyamide or polyesteramide, where at least one monomer is at least trifunctional, and
   a solvent,
   (iv) optionally applying further powder layers required for the production of the shaped body and printing a liquid composition on defined areas of each of the further powder layers, the liquid composition comprising
   one or more monomers for the preparation of a polyester, polyamide or polyesteramide, where at least one monomer is at least trifunctional, and
   a solvent,
   (v) thermally treating the liquid composition applied by printing, thereby forming a polyester, a polyamide or a polyesteramide and obtaining a shaped body wherein the powder within the shaped body is bonded by the polyester, polyamide or polyesteramide,
   wherein the solvent of step (ii), the solvent of step (iii), and the solvent of step (iv) are each selected from the group consisting of water, ethanol, isopropanol, and a mixture of at least two of these solvents.

2. The process of claim 1, wherein the thermal treatment in step (v) takes place at a temperature of at least 130° C.

3. The process of claim 1, wherein the polyester, polyamide or polyesteramide is prepared by polycondensation.

4. The process of claim 1, wherein the at least trifunctional monomer is a compound having at least three functional groups $A^1$, $A^2$ and $A^3$, where the functional groups $A^1$, $A^2$ and $A^3$ are, independently from each other, a hydroxy group, an amino group, a carboxylic acid group or salt of said carboxylic acid group, a carboxylic ester group or an acyl halide group.

5. The process of claim 1, wherein the at least trifunctional monomer is a compound having at least three functional groups A1, A2 and A3, where two of the functional groups A1-A3 together form a carboxylic anhydride group or a cyclic ether group and the third functional group is a hydroxy group, an amino group, a carboxylic acid group or salt of said carboxylic acid group, a carboxylic ester group or an acyl halide group.

6. The process of claim 1, wherein the at least trifunctional monomer is a polyol having at least 3 hydroxy groups; an aromatic trihydroxy compound; a polyamine having at least 3 amine groups; a hydroxycarboxylic acid in which the sum total of the hydroxy groups and the carboxylic acid groups is at least 3; an amino acid in which the sum total of the amino groups and the carboxylic acid groups is at least 3; a hydroxyamino acid; a polycarboxylic acid having at least 3 carboxylic acid groups; or a mixture of at least two of the abovementioned compounds.

7. The process of claim 1, wherein the liquid composition comprises, as at least trifunctional monomers,
   (a) a polyol having at least 3 hydroxy groups or a polyamine having at least 3 amine groups or a mixture thereof; and
   (b) at least one of the following compounds:
   (b1) a hydroxycarboxylic acid in which the sum total of the hydroxy groups and the carboxylic acid groups is at least 3,
   (b2) an amino acid in which the sum total of the amino groups and the carboxylic acid groups is at least 3,
   (b3) a hydroxyamino acid,
   (b4) a polycarboxylic acid containing at least 3 carboxylic acid groups or an anhydride of said polycarboxylic acid.

8. The process of claim 1, wherein the liquid composition comprises one or more bifunctional monomers.

9. The process of claim 8, wherein the wherein the bifunctional monomer is one of the following compounds (i)-(iii) or a mixture of at least two of these compounds:

(i) a compound having a functional group A and a functional group B, where, the functional group A is an amino group or a hydroxy group, and the functional group B is a carboxylic acid group or salt of said carboxylic acid group, a carboxylic ester group or an acyl halide group;

(ii) a compound having a functional group A and a functional group A', where the functional groups A and A' are, independently from each other, a carboxylic acid group or salt of said carboxylic acid group, a carboxylic ester group or an acyl halide group, or where the functional groups A and A' together form a carboxylic anhydride group;

a compound having a functional group B and a functional group B', where the functional groups B and B' are, independently from each other, a hydroxy group or an amino group, or where the functional groups B and B' together form a cyclic ether group.

* * * * *